(12) United States Patent
Hayashi et al.

(10) Patent No.: US 10,382,690 B2
(45) Date of Patent: Aug. 13, 2019

(54) INFORMATION ACQUIRING DEVICE, INFORMATION PLAYBACK DEVICE, INFORMATION ACQUIRING METHOD, INFORMATION PLAYBACK METHOD, AND COMPUTER-READABLE RECORDING MEDIUM

(71) Applicant: Olympus Corporation, Hachioji-shi, Tokyo (JP)

(72) Inventors: Toshikazu Hayashi, Sagamihara (JP); Toshihiro Ogata, Hachioji (JP); Kazuo Kanda, Higashiyamato (JP); Hideaki Yoshida, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 350 days.

(21) Appl. No.: 15/176,574

(22) Filed: Jun. 8, 2016

(65) Prior Publication Data
US 2017/0094177 A1 Mar. 30, 2017

Related U.S. Application Data

(63) Continuation of application No. PCT/JP2015/085694, filed on Dec. 21, 2015.

(30) Foreign Application Priority Data

Sep. 24, 2015 (JP) ................. 2015-187023

(51) Int. Cl.
*H04N 7/18* (2006.01)
*H04N 5/232* (2006.01)
(Continued)

(52) U.S. Cl.
CPC ......... *H04N 5/23293* (2013.01); *G01L 19/00* (2013.01); *G06F 16/51* (2019.01); *H04N 5/772* (2013.01)

(58) Field of Classification Search
CPC ..................................... H04N 5/225
(Continued)

(56) References Cited

U.S. PATENT DOCUMENTS 8,531,515 B2 * 9/2013 Watanabe .............. H04N 5/232
348/81
2011/0228075 A1 9/2011 Madden et al.
2013/0322840 A1 12/2013 Komatsu et al.

FOREIGN PATENT DOCUMENTS

CN 102822738 A 12/2012
JP 06-067277 3/1994
(Continued)

OTHER PUBLICATIONS

International Search Report to corresponding International Patent Application No. PCT/JP2015/085694, dated Feb. 23, 2016 (4 pgs.).
(Continued)

*Primary Examiner* — Anand S Rao
(74) *Attorney, Agent, or Firm* — John C. Pokotylo; Pokotylo Patent Services

(57) ABSTRACT

An information acquiring device for acquiring information data of an object includes: a condition detecting unit configured to detect use condition data of the information acquiring device; and a file generating unit configured to generate a file in which the information data, the use condition data, and information on response characteristics of the condition detecting unit are associated with one another. A method for acquiring information executed by an information acquiring device includes: acquiring information data of an object and storing the information data in a storage unit; detecting use condition data of the information acquiring device and storing the use condition data in the storage unit; and reading the information data and the use condition data from the storage unit, and generating a file in which the information data and the use condition data are
(Continued)

associated with information on response characteristics in detecting the use condition data.

20 Claims, 13 Drawing Sheets

(51) Int. Cl.
*G06F 16/51* (2019.01)
*G01L 19/00* (2006.01)
*H04N 5/77* (2006.01)

(58) Field of Classification Search
USPC .......................................................... 348/158
See application file for complete search history.

(56) References Cited

FOREIGN PATENT DOCUMENTS

| | | |
|---|---|---|
| JP | 2001-036794 A | 2/2001 |
| JP | 2004-312281 | 11/2004 |
| JP | 2004-326192 | 11/2004 |
| JP | 2008-180898 | 8/2008 |
| JP | 2012-044454 | 3/2012 |
| JP | 2012-138813 | 7/2012 |
| JP | 2014-171057 | 9/2014 |
| JP | 2014-236319 | 12/2014 |

OTHER PUBLICATIONS

Corrected version of International Search Report to corresponding International Patent Application No. PCT/JP2015/085694, dated Apr. 4, 2016 (3 pgs.).

First Office Action to corresponding Chinese Patent Application No. 201580002763.2, dated Jan. 22, 2019 (17 pgs.), with translation (11 pgs.).

Extended European Search Report to corresponding European Patent Application No. 15904744.8, dated Feb. 18, 2019 (12 pgs.).

Notice of Reasons for Refusal from corresponding Japanese Patent Application Serial No. 2015-187023, dated May 28, 2019 (2pgs.) with translation (4 pgs.).

\* cited by examiner

FIG.16

|  | UNDER WATER ||  ON GROUND |
| --- | --- | --- | --- |
|  | SKIN DIVE | FLOATING |  |
| STILL IMAGE CAPTURING | ONE HAND | BOTH HANDS | BOTH HANDS/ ONE HAND |
| MOVING IMAGE CAPTURING | × | ONE HAND | BOTH HANDS/ ONE HAND |
| SWITCH OPERATION | DIFFICULT | EASY | EASY |

INFORMATION ACQUIRING DEVICE, INFORMATION PLAYBACK DEVICE, INFORMATION ACQUIRING METHOD, INFORMATION PLAYBACK METHOD, AND COMPUTER-READABLE RECORDING MEDIUM

CROSS-REFERENCE TO RELATED APPLICATIONS

This application is a continuation of PCT international application Ser. No. PCT/JP2015/085694 filed on Dec. 21, 2015 which designates the United States, incorporated herein by reference, and which claims the benefit of priority from Japanese Patent Application No. 2015-187023, filed on Sep. 24, 2015, incorporated herein by reference.

BACKGROUND

1. Technical Field

The disclosure relates to an information acquiring device, an information playback device, an information acquiring method, an information playback method, and a computer-readable recording medium.

2. Related Art

In recent years, with respect to devices for acquiring information, such as imaging devices like digital cameras or digital video cameras, technologies that incorporate a function suitable for imaging under water have been in progress. For example, JP 6-67277 A discloses a camera that includes a water pressure sensor that detects a water depth, and records water depth data in performing image capturing and image data in association with each other. The water depth data is one of information that reminds a user of a situation in the image capturing when the user enjoys the captured image data some time later.

SUMMARY

In some embodiments, an information acquiring device for acquiring information data of an object includes: a condition detecting unit configured to detect use condition data of the information acquiring device; and a file generating unit configured to generate a file in which the information data, the use condition data, and information on response characteristics of the condition detecting unit are associated with one another.

In some embodiments, an information acquiring device for acquiring information data of an object includes: a condition detecting unit configured to periodically detect use condition data of the information acquiring device; and a file generating unit configured to generate a file in which time data when the use condition data is detected, the use condition data, and information on response characteristics of the condition detecting unit are associated with one another.

In some embodiments, an information playback device for playing back information acquired by an information acquiring device is provided. The information acquiring device is configured to acquire information data of an object and includes a condition detecting unit configured to detect use condition data of the information acquiring device. The information playback device includes: a playback control unit configured to: acquire a file in which the information data of the object acquired by the information acquiring device, the use condition data of the information acquiring device, and information on response characteristics of the condition detecting unit are associated with one another; and play back information which has been processed according to the response characteristics, together with the information data.

In some embodiments, a method for acquiring information executed by an information acquiring device for acquiring information data of an object is provided. The method includes: acquiring the information data of the object and storing the information data in a storage unit; detecting use condition data of the information acquiring device and storing the use condition data in the storage unit; and reading the information data and the use condition data from the storage unit, and generating a file in which the information data and the use condition data are associated with information on response characteristics in detecting the use condition data.

In some embodiments, a method for acquiring information executed by an information acquiring device for acquiring information data of an object is provided. The method includes: acquiring the information data of the object and storing the information data in a storage unit; periodically detecting use condition data of the information acquiring device and storing the use condition data in the storage unit; and reading, from the storage unit, the use condition data and time data when the use condition data is detected, and generating a file in which the time data and the use condition data are associated with information on response characteristics in detecting the use condition data.

In some embodiments, a method for playing back information executed by an information playback device for playing back information acquired by an information acquiring device is provided. The information acquiring device is configured to acquire information data of an object and includes a condition detecting unit configured to detect use condition data of the information acquiring device. The method includes: acquiring, from a storage unit, a file in which the information data of the object acquired by the information acquiring device, the use condition data of the information acquiring device, and information on response characteristics of the condition detecting unit are associated with one another, and playing back information which has been processed according to the response characteristics, together with the information data.

In some embodiments, a non-transitory computer-readable recording medium with an executable program stored thereon is provided. The program instructs an information acquiring device that acquires information data of an object, to execute: acquiring the information data of the object; detecting use condition data of the information acquiring device; and generating a file in which the information data, the use condition data, and information on response characteristics in detecting the use condition data are associated with one another.

In some embodiments, a non-transitory computer-readable recording medium with an executable program stored thereon is provided. The program instructs an information acquiring device that acquires information of an object, to execute: acquiring the information data of the object and storing the information data in a storage unit; periodically detecting use condition data of the information acquiring device; and generating a file in which time data when the use condition data is detected, the use condition data, and information on response characteristics in detecting the use condition data are associated with one another.

In some embodiments, a non-transitory computer-readable recording medium with an executable program stored thereon is provided. The program instructs an information playback device that plays back information acquired by an information acquiring device, the information acquiring device being configured to acquire information data of an object and including a condition detecting unit configured to detect use condition data of the information acquiring device, to execute: acquiring, from a storage unit, a file in which the information data of the object acquired by the information acquiring device, the use condition data of the information acquiring device, and information on response characteristics of the condition detecting unit are associated with one another, and playing back information which has been processed according to the response characteristics, together with the information data.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a diagram illustrating how to hold an imaging device in still image capturing and moving image capturing, and difficulty in a switch operation, according to use situations of the imaging device according to a second embodiment of the present invention.

DETAILED DESCRIPTION

Hereinafter, modes for carrying out the present invention (hereinafter, referred to as "embodiment(s)") will be described with reference to the appended drawings.

First Embodiment

An information acquiring device according to a first embodiment of the present invention includes an information acquiring unit that acquires information data of an object, a condition detecting unit that detects use condition data of the information acquiring device, and a control unit that generates a file in which the information data, the use condition data, and information related to a constraint condition of the condition detecting unit are associated.

Figure 1:
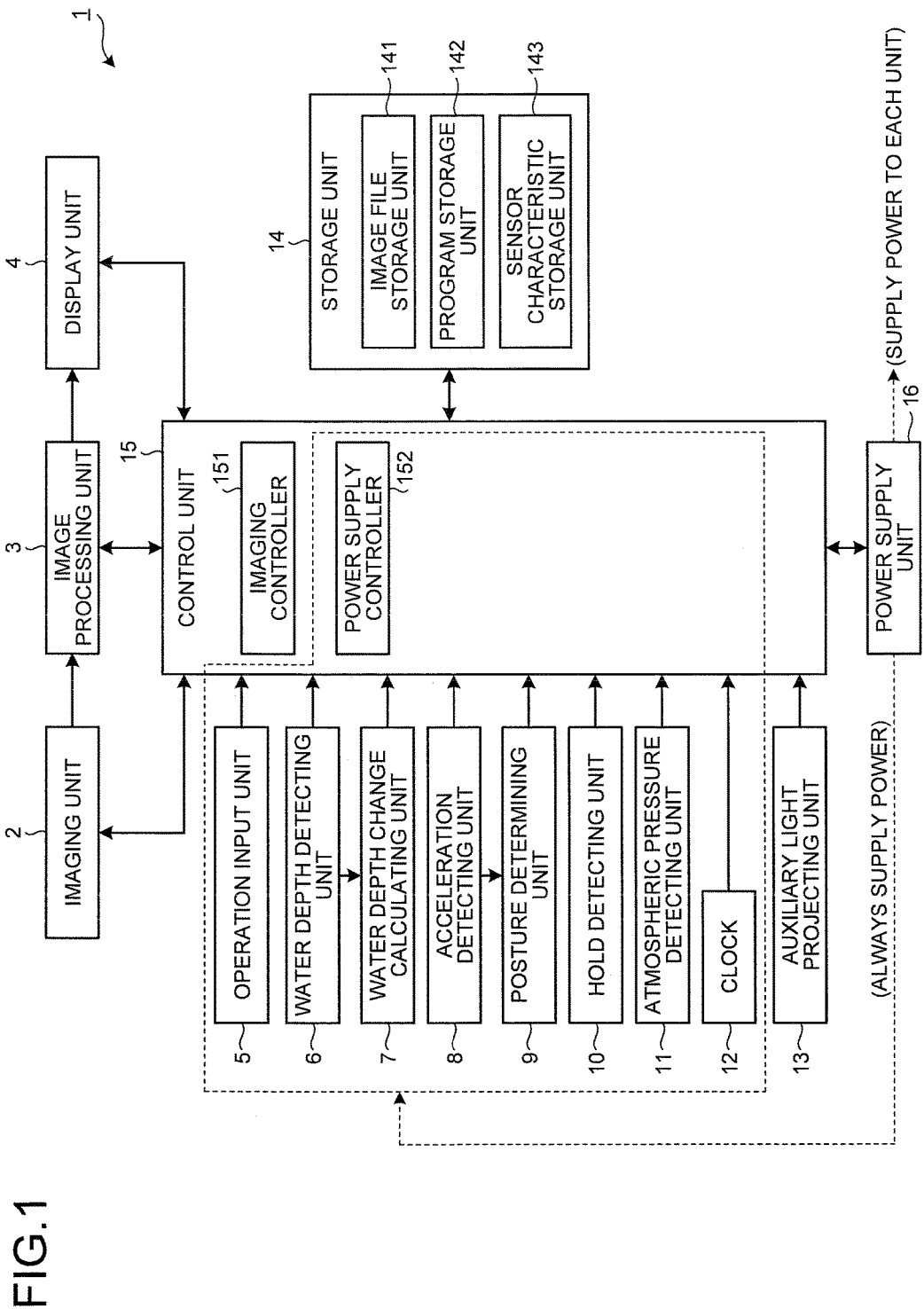
FIG. 1 is a block diagram illustrating a configuration of an imaging device according to a first embodiment of the present invention.

FIG. 1 is a block diagram illustrating a configuration of an imaging device that is an example of the information acquiring device according to the first embodiment of the present invention. An imaging device 1 illustrated in FIG. 1 includes an imaging unit 2 that images a subject and generates electronic image data of the imaged image, an image processing unit 3 that performs image processing such as edge enhancement, color collection, and image compression on the image data generated by the imaging unit 2 to create an image file, a display unit 4 that displays information including an image corresponding to the image data having been subjected to the processing by the image processing unit 3, an operation input unit 5 that receives inputs of various operation signals and the like of the imaging device 1, a water depth detecting unit 6 that detects a water depth of the imaging device 1 in a predetermined period, a water depth change calculating unit 7 that calculates a change amount of the water depth detected by the water depth detecting unit 6, an acceleration detecting unit 8 that detects acceleration according to external force (including gravity) applied to the imaging device 1, a posture determining unit 9 that determines a posture of the imaging device 1 based on a detection result of the gravity acceleration in the acceleration detecting unit 8, a hold detecting unit 10 that detects hold of the imaging device 1 in a predetermined area from an outside, an atmospheric pressure detecting unit 11 that detects atmospheric pressure, a clock 12 having a determination function of imaging date and time and a timer function, an auxiliary light projecting unit 13 that projects auxiliary light to a visual field area of the imaging unit 2, a storage unit 14 that stores various types of information including the image data on which the processing has been performed by the image processing unit 3, a control unit 15 that controls an operation of the imaging device 1 according to the operation signals and the like input by the operation input unit 5, and a power supply unit 16 that supplies power to each element of the imaging device 1 under control of the control unit 15.

The imaging unit 2 is configured from one or a plurality of lenses, and includes an optical system that collects light from a subject existing in a predetermined visual field area, a diaphragm that adjusts an incident amount of light collected by the optical system, a shutter operated according to a release input, an image sensor such as a complementary metal oxide semiconductor (CMOS) or a charge coupled device (CCD) that receives light that has passed through the diaphragm and the shutter and converts the light into an electrical signal, and a signal processing circuit that generates digital image data by performing A/D conversion after performing signal processing such as amplification and white balance on an analog signal output from the image sensor.

The image processing unit 3 has a function as a file generating unit that generates the image file including the image data imaged by the imaging unit 2, and writes and stores the generated image file in an image file storage unit 141 included in the storage unit 14. The image processing unit 3 is configured from a general-purpose processor such as a central processing unit (CPU).

The display unit 4 is provided on a surface (back surface) positioned at a rear side of a surface (front surface) where the optical system of the imaging unit 2 is exhibited, and appropriately displays operation information of the imaging device 1 and information related to capturing, in addition to the image data. The display unit 4 is realized using a display panel made of liquid crystal, plasma, organic electro luminescence (EL), or the like.

The operation input unit 5 includes a release switch that inputs a release signal, and a power supply switch that inputs instruction signals of power supply ON and power supply OFF. Note that, in the present first embodiment, the "power supply ON" means that power supply to the entire imaging device 1 by the power supply unit 16 is transferred to a power suppliable state, and the "power supply OFF" means that the power supply to the entire imaging device 1 by the power supply unit 16 is stopped.

The water depth detecting unit 6 is realized using a water pressure sensor. The water pressure detected by the water pressure sensor is about 1060 hectopascal (hPa) in the water depth of 50 cm, and becomes larger as the water depth becomes deeper. The water depth detecting unit 6 has a function to temporarily store at least two recent water depth detection results.

When the release switch of the operation input unit 5 is pressed, the water depth change calculating unit 7 calculates change of the two recent water depths detected by the water depth detecting unit 6. The water depth change calculating unit 7 has a function to determine whether the detection result by the water depth detecting unit 6 is a value that can be considered as under water. When the release switch is pressed in a state where no power is supplied to a portion including the imaging unit 2, and when the power is supplied to the entire imaging device 1 including the imaging unit 2, and an operation input other than the release switch has been performed in the operation input unit 5, the water depth change calculating unit 7 calculates the change of the water depths.

Figure 2:
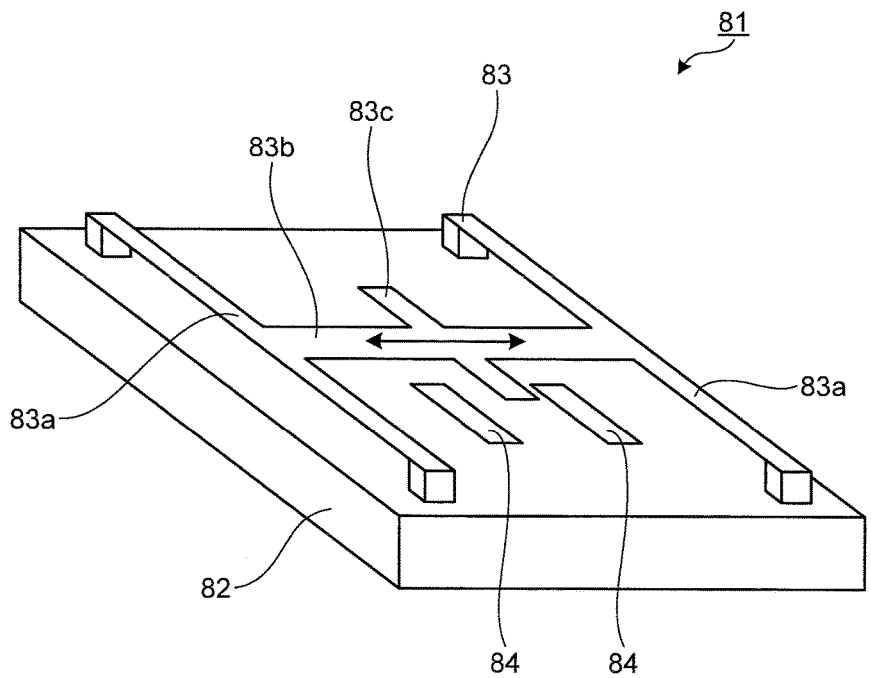
FIG. 2 is a diagram illustrating a configuration of an acceleration sensor that forms a part of an acceleration detecting unit of the imaging device according to the first embodiment of the present invention.

FIG. 2 is a diagram illustrating a configuration of an acceleration sensor that forms a part of the acceleration detecting unit 8. An acceleration sensor 81 illustrated in FIG. 2 is a capacitive acceleration sensor formed by a micro electro mechanical systems (MEMS) process. The acceleration sensor 81 includes a metal movable portion 83 having a beam structure with end portions bridged in a state of being fixed to vicinities of four corners of the principal plane of a rectangular parallelepiped chip 82, and two metal flat plate portions 84 provided on the principal plane that is of the chip 82 and on which the end portions of the movable portion 83 are fixed. The movable portion 83 includes two extending portions 83a extending along the same direction on the principal plane of the chip 82, and both end portions of which are fixed, a connecting portion 83b that connects central portions of the two extending portions 83a in a direction perpendicular to the direction into which the extending portions 83a extend, and a protruding portion 83c protruding in a belt manner in parallel to the direction into which the extending portions 83a extend from a central portion of the connecting portion 83b. When acceleration is applied to the acceleration sensor 81 in a right and left direction (the arrow direction) of FIG. 2, the movable portion 83 is bent in the right and left direction and deformed. Therefore, a positional relationship between the protruding portion 83c and the flat plate portion 84 is changed and an electrostatic capacity is changed. The acceleration sensor 81 outputs change of a signal based on the change of the electrostatic capacity. Note that the acceleration detecting unit 8 can be used when determination of hand shake and correction based on the determination are performed.

Figure 3:
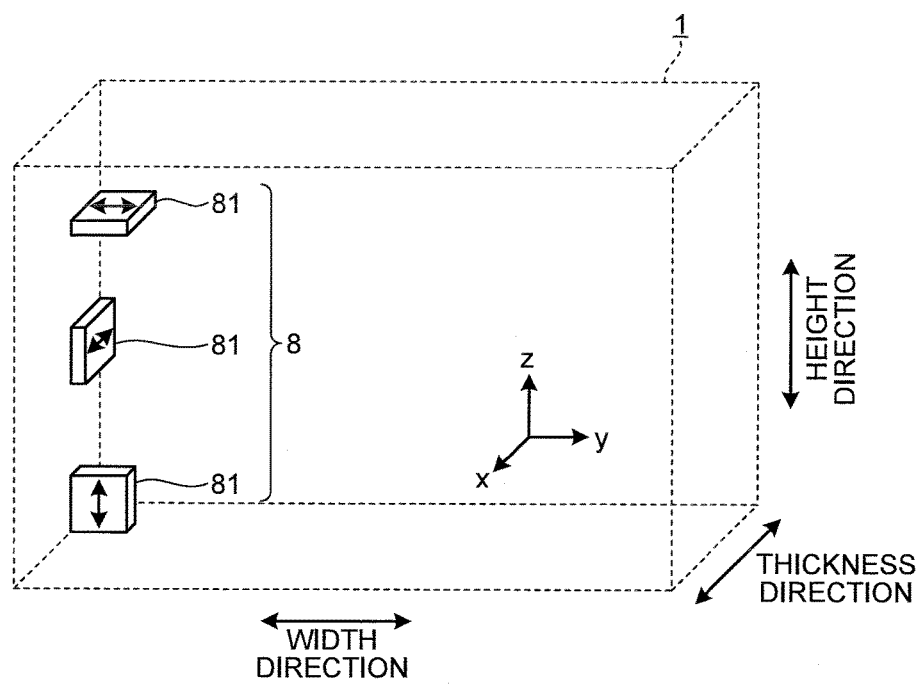
FIG. 3 is a diagram schematically illustrating a configuration of the acceleration detecting unit of the imaging device according to the first embodiment of the present invention.

FIG. 3 is a diagram schematically illustrating a configuration of the acceleration detecting unit 8. As illustrated in FIG. 3, the acceleration detecting unit 8 includes three acceleration sensors 81 in which detecting directions of the acceleration are perpendicular to one another. To be specific, as a coordinate system unique to the imaging device 1 (hereinafter, the coordinate system is referred to as "imaging coordinate system"), an x axis parallel to a thickness direction of the imaging device 1, a y axis parallel to a width direction of the imaging device 1, and a z axis parallel to a height direction of the imaging device 1 are set, and the three acceleration sensors 81 that respectively detect acceleration components of the respective axis directions are attached to predetermined positions of a main body portion of the imaging device 1. According to the acceleration detecting unit 8 having such a configuration, when a user performs a tap operation to momentarily tap the surface of the imaging device 1, the acceleration detecting unit 8 can precisely detect the acceleration caused by the tap operation.

Figure 4:
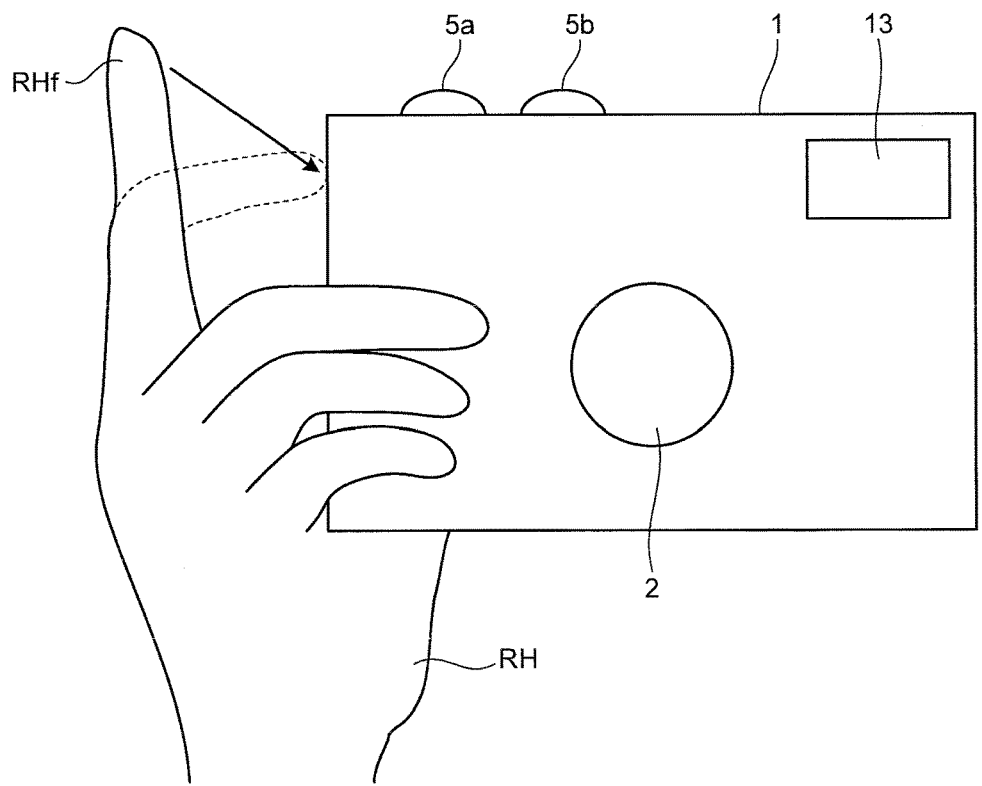
FIG. 4 is a diagram illustrating a situation where a user taps the imaging device according to the first embodiment of the present invention.

FIG. 4 is a diagram illustrating a situation where the user taps the surface of the imaging device 1. When the user taps a left-side surface of the surface of the imaging device 1 as viewed from a front side, with an index finger RHf of a right hand RH, the acceleration detecting unit 8 detects the acceleration that includes a component mainly in the right and left direction of FIG. 4, having magnitude larger than a predetermined value that can be considered as tap, and indicates pulse-like temporal change. Accordingly, the imaging device 1 having been tapped can be detected. The first embodiment has a high possibility that there is vibration similar to the tap, such as at the time of carrying the imaging device 1 on the ground. Therefore, the power supply is prevented from being easily turned ON by the tap. In contrast, when the water depth (water pressure) is nearly constant under water, there is resistance of water, and the predetermined value is determined in view of the fact that the tap signal is generated only when the user intentionally taps the imaging device 1. Note that, in FIG. 4, two buttons 5a and 5b provided on an upper surface of the imaging device 1 are a release switch and a power supply switch, respectively. Hereinafter, the button 5*a* is referred to as release switch 5*a*, and the button 5*b* is referred to as power supply switch 5*b*.

The posture determining unit 9 is configured by a combination of a comparator and a logic circuit, for example. With such a posture determining unit 9, a power supply ON operation based on posture change of the imaging device 1 on the ground can be realized. Note that the posture determining unit 9 can be realized as one function of the control unit 15. The posture determining unit 9 determines the posture based on the output of the acceleration detecting unit 8 to detect an elevation angle, a depression angle, and the like of the imaging device 1, and thereby to be used to identify an imaging object. Further, a direction into which a predetermined portion of the imaging device 1 (for example, an optical axis of the imaging unit 2) faces can be detected using an electronic compass.

Figure 5:
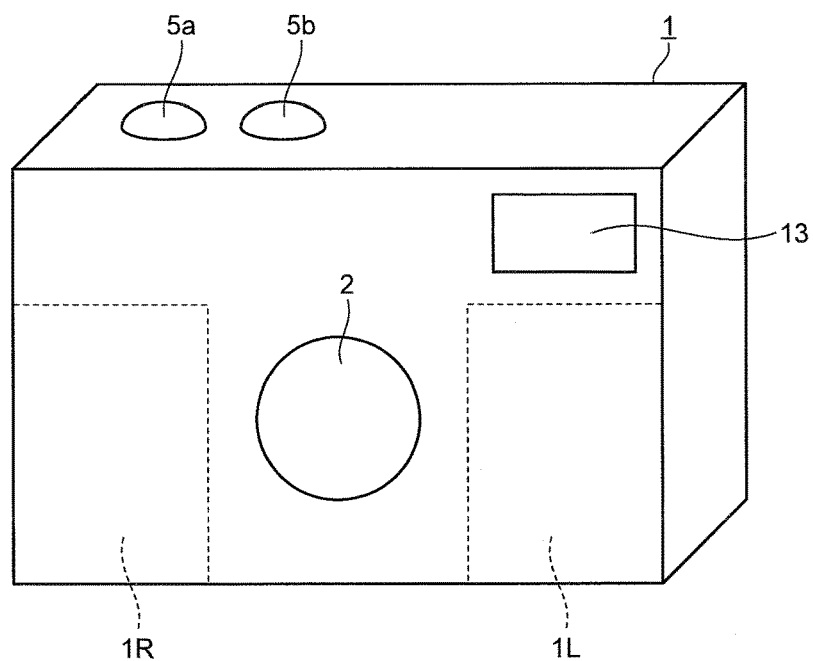
FIG. 5 is a diagram schematically illustrating a detectable area of a hold detecting unit of the imaging device according to the first embodiment of the present invention.
Figure 6:
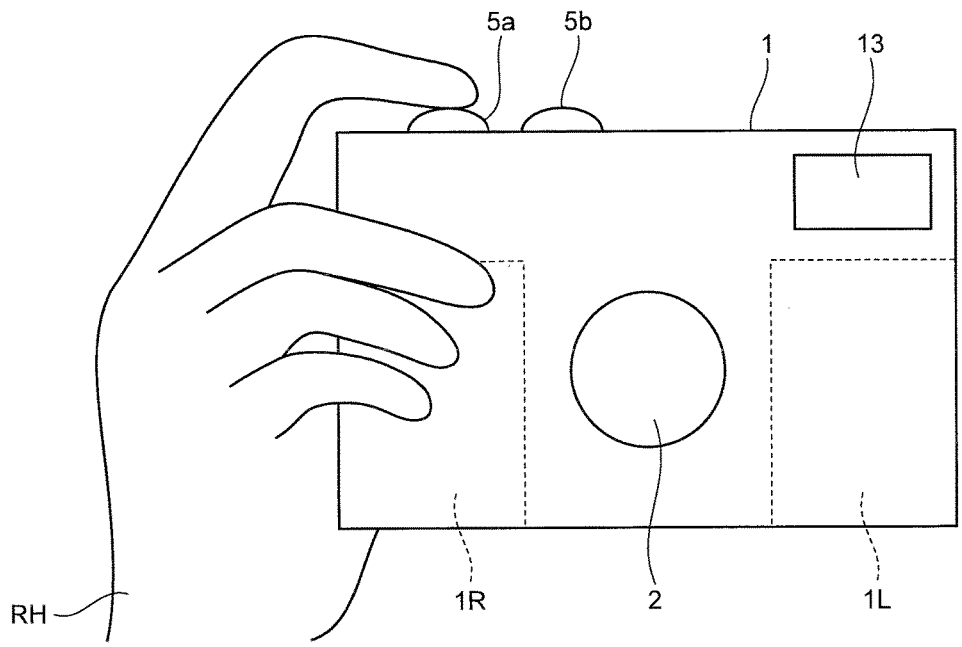
FIG. 6 is a diagram illustrating a situation in which a user holds the imaging device according to the first embodiment of the present invention with one hand.

FIG. 5 is a diagram schematically illustrating a detectable area of the hold detecting unit 10. The hold detecting unit 10 has a function to detect existence/non-existence of contact from an outside to right and left rectangular areas 1L and 1R on a front surface of the imaging device 1. The hold detecting unit 10 having such a function is realized by installing one or a plurality of pressure sensors inside both of the rectangular areas 1L and 1R. When the user holds the imaging device 1 with both hands, the hold detecting unit 10 detects the contact in the rectangular areas 1L and 1R from an outside. Meanwhile, when the user holds the imaging device 1 with one hand, the hold detecting unit 10 detects the contact in either the rectangular area 1L or 1R from an outside. Note that, in the case of the imaging device 1 illustrated in FIG. 5, the release switch 5*a* and the power supply switch 5*b* are provided on the right side of the upper surface as viewed from the user. Therefore, as illustrated in FIG. 6, there is a high possibility that the user holds the imaging device 1 with the right hand RH. Therefore, when the user holds the imaging device 1 with one hand, there is a high possibility that the hold detecting unit 10 detects the contact to the rectangular area 1R from an outside.

By the way, a technology to monitor reflection of infrared rays and the like to determine pulse and blood flow using the contact sensor is known. The hold detecting unit 10 includes such a contact sensor, thereby to detect biological information. Note that if a temperature sensor is installed together with the imaging device 1, a body temperature of the user can also be detected.

Further, between a case of determination on the rectangular area 1R and a case of determination on the rectangular area 1L, detection results may be changed depending on characteristics of the sensors and the way of gripping the imaging device 1 by the user. Therefore, it is more favorable to store information related to the detected rectangular area in the storage unit 14 as use condition data (information). For example, a difference is caused due to a heat radiation characteristic, a heat conduction characteristic, and the like of material that configures the imaging device 1, and the like, in addition to a difference depending on a portion of a human body, such as the body temperature. Therefore, the use condition data is important information. Thus, by storing the use condition data, the detection result can be accurately treated for the first time.

The atmospheric pressure detecting unit 11 is realized using an atmospheric pressure sensor. The atmospheric pressure detected by the atmospheric pressure sensor is in a range of about 100 to 1500 hPa. Note that the atmospheric pressure sensor may detect the water pressure. Further, an altitude can be calculated and recorded using the atmospheric pressure. Note that an error can be easily caused in the atmospheric pressure and the altitude due to weather. Therefore, it is more favorable to add information describing the fact that the error can be easily caused, as a constraint condition.

The water depth detecting unit 6, the water depth change calculating unit 7, the acceleration detecting unit 8, the posture determining unit 9, the hold detecting unit 10, and the atmospheric pressure detecting unit 11 have a part of functions as a condition detecting unit that detects a condition of the imaging device 1. These functions are subject to influences of performance such as resolutions, mounting conditions, layouts, environment noises, response characteristics (time constants), and sensitivity of various sensors and peripheral circuits. That is, the condition detecting unit does not necessarily output an ideal value, and the function is accompanied by a constant constraint condition or a constraint condition due to environment change.

The storage unit 14 includes an image file storage unit 141 that stores the image file including the image data which has been captured by the imaging unit 2 and on which the processing has been performed by the image processing unit 3, a program storage unit 142 that stores various programs to be executed by the imaging device 1, and a sensor characteristic storage unit 143 that stores sensor characteristic information of the various sensors that configure the condition detecting unit. The sensor characteristic information stored in the sensor characteristic storage unit 143 is, for example, information related to response times (time constants) of the sensors, relationships between errors of the sensors and ambient temperature and/or humidity of the imaging device 1, and the like. The storage unit 14 stores the various programs including an imaging program for executing an imaging method according to the present embodiment. Note that the storage unit 14 may store a file in which only surrounding environment change information is recorded as the log data.

The storage unit 14 is configured from a volatile memory such as a random access memory (RAM) and a non-volatile memory such as a read only memory (ROM). Note that the storage unit 14 may be configured from a computer-readable recording medium such as a memory card attachable from an outside.

Figure 7:
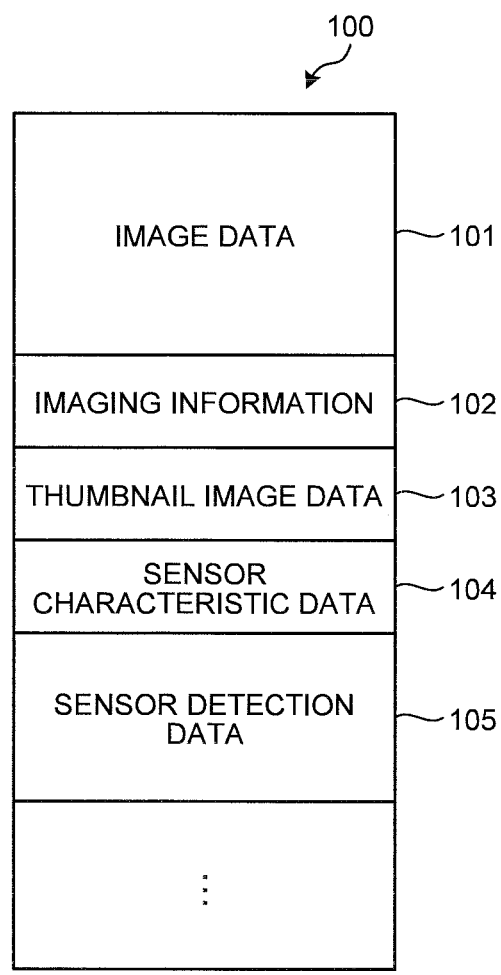
FIG. 7 is a diagram schematically illustrating a configuration of an image file.

FIG. 7 is a diagram schematically illustrating a configuration of an image file. An image file 100 includes image data 101, imaging information 102, thumbnail image data 103, sensor characteristic data 104, and sensor detection data 105. The imaging information 102 is information in generating the image data 101, and includes, for example, information including a generation time and date, exposure, a point of focus, ISO sensitivity, and the like. The sensor characteristic data 104 is data read from the sensor characteristic storage unit 143 and written, and includes the characteristic information of the various sensors. An example of the sensor characteristic includes the response times (time constants) of the various sensors. As the sensor detection data 105, detection data of the various sensors is recorded only in a predetermined recording period including image capturing timing. The image capturing timing referred here is timing when the user inputs an image capturing instruction signal (release signal). The recording period is set based on the characteristic information of the various sensors, and is favorably set to include a period from the image capturing timing to the response times of the various sensors, for example.

The control unit 15 includes an imaging controller 151 that controls imaging in the imaging unit 2 and a power supply controller 152 that controls supply of the power supply by the power supply unit 16. The control unit 15 is realized by a central processing unit (CPU), and is connected with each element of the imaging device 1 through a bus line. The control unit 15 is configured from a general-purpose processor such as a CPU. The control unit 15 may share a common CPU with the image processing unit 3.

Note that the control unit 15 may have the function as a file generating unit that generates the image file. Further, the control unit 15 may have a function to generate an environment change file in which only environment change information and use situation information are generated as log data, in addition to the function to generate the image file. This is because the function that the condition detecting unit has is subject to the influences of performance such as resolutions, mounting conditions, layouts, environment noises, response characteristics (time constants), and sensitivity of the various sensors and peripheral circuits, as described above. Therefore, the function is accompanied by the constant constraint condition or the constraint condition due to environment change.

Further, the control unit 15 may have a function to acquire a file in which information data of an object, the use condition data of the information acquiring device, information related to a predetermined constraint condition of the condition detecting unit are associated, and to play back information processed according to the constraint condition together with the information data, as a playback control unit. That is, when displaying the capturing data in the display unit 4, the control unit 15 may display the environment information and the use condition data at the same time. There is a possibility that an error may be caused in the environment information and the use condition data, as described above. Therefore, the fact that the error may be caused may be displayed as information of the constraint condition. Further, the control unit 15 may perform processing of reducing the error of the environment information and the use condition data by performing processing such as averaging of a plurality of data and interpolation as processing according to the constraint condition, and reflect a result of the processing at the time of image playback. As specific examples of the reflection referred here, completion of the processing of reducing the error may be expressed by letters or characters, or a special effect that enables the completion of the processing of reducing the error to be identifiable may be added to the played-back image itself. In this way, the imaging device 1 can function as an information playback device including a playback control unit.

Note that, typically, the information acquiring device and the information playback device can be separate bodies. In this case, communication through a communication network may be performed between the information acquiring device and the information playback device. When the information playback device can acquire another information through the communication network, the information playback device can perform more accurate playback and provide information by reference to the information.

The power supply unit 16 supplies the power to the operation input unit 5, the water depth detecting unit 6, the water depth change calculating unit 7, the acceleration detecting unit 8, the posture determining unit 9, the hold detecting unit 10, the atmospheric pressure detecting unit 11, the clock 12, and the power supply controller 152 on a steady basis regardless of whether the imaging device 1 is started with the power supply switch 5*b*. Therefore, the operation input unit 5, the water depth detecting unit 6, the water depth change calculating unit 7, the acceleration detecting unit 8, the posture determining unit 9, the hold detecting unit 10, the atmospheric pressure detecting unit 11, the clock 12, and the power supply controller 152 are always activated regardless of whether the power supply is ON. Hereinafter, the operation input unit 5, the water depth detecting unit 6, the water depth change calculating unit 7, the acceleration detecting unit 8, the posture determining unit 9, the hold detecting unit 10, the atmospheric pressure detecting unit 11, the clock 12, and the power supply controller 152 are referred to as always-power-supplied portions.

Note that there is a situation where the power supply is extremely suppressed. Therefore, the always-power-supplied portions may be changed according to mode setting by the user, or the like. For example, an underwater shooting mode or the like is made manually settable, and only when the underwater shooting mode is set, the power supply may be supplied to the water depth detecting unit 6, the water depth change calculating unit 7, the hold detecting unit 10, and the like.

The imaging device 1 having the above configuration is packaged with a housing having a waterproof structure with a sealed surface. A housing having such a waterproof structure is disclosed in JP 2008-180898 A, for example.

Figure 8:
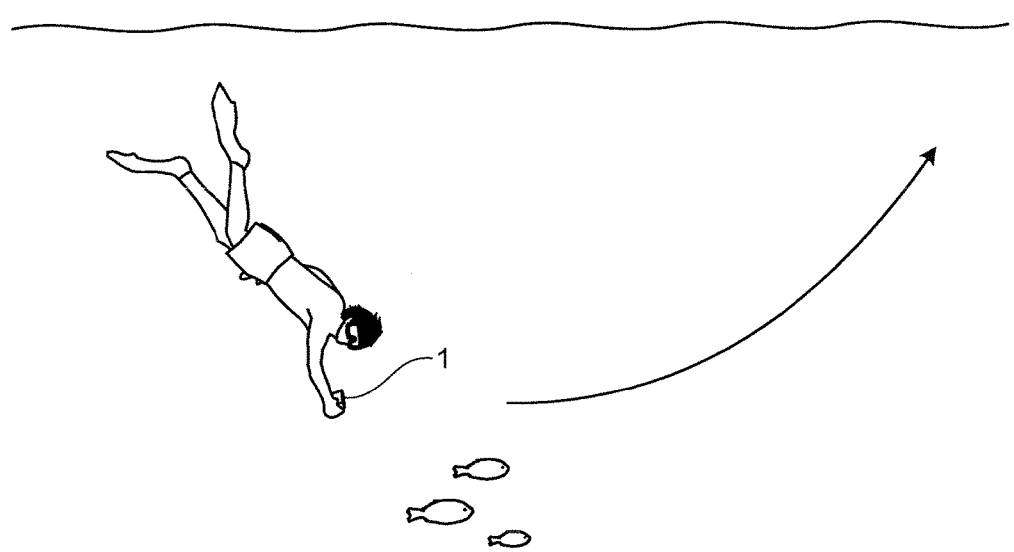
FIG. 8 is a diagram illustrating a situation in which a user performs skin diving under water and performs shooting using the imaging device according to the first embodiment of the present invention.
Figure 9:
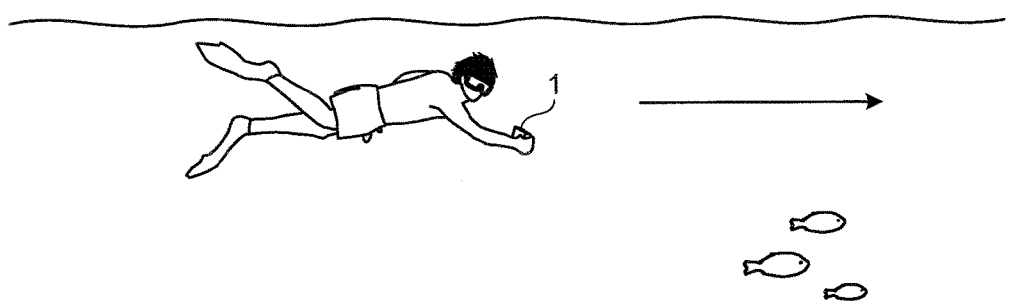
FIG. 9 is a diagram illustrating a situation in which a user performs shooting while floating near the surface of the water using the imaging device according to the first embodiment of the present invention.

FIGS. 8 and 9 are diagrams illustrating a situation where characteristic processing is performed for the imaging device 1. To be specific, while FIG. 8 illustrates a situation where the user performs skin diving under water and performs shooting, FIG. 9 illustrates a situation where the user performs shooting while floating near the surface of the water. Note that, in the first embodiment, the "skin diving" includes snorkeling, but does not include diving using heavy equipment, such as scuba diving.

Figure 10:
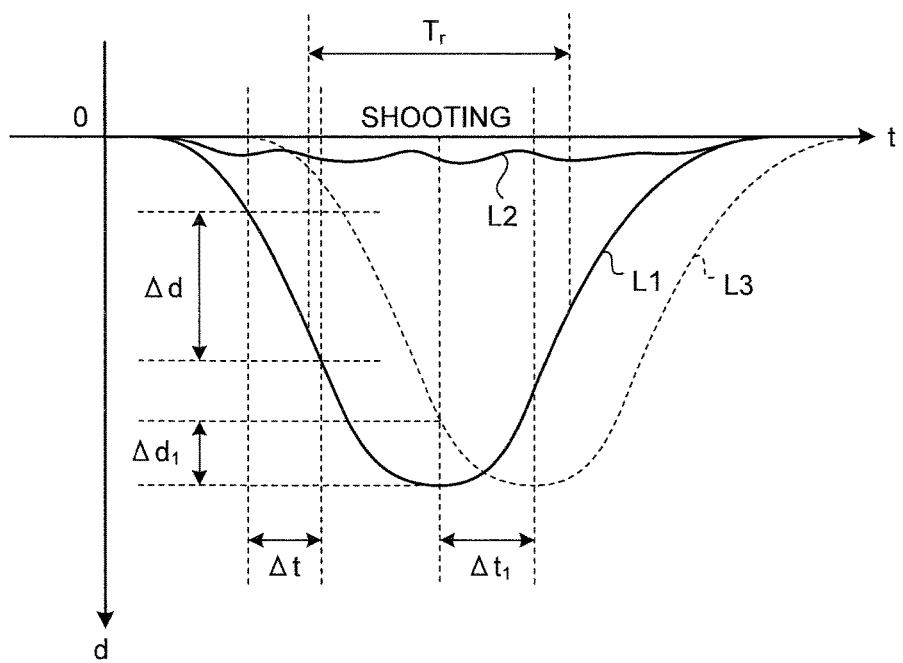
FIG. 10 is a diagram illustrating a temporal change in a water depth of the imaging device when a user performs shooting under water using the imaging device according to the first embodiment of the present invention.

In the case of the skin diving capturing illustrated in FIG. 8, the user needs to hold his/her breath while diving under water. Therefore, the possibility that the water depth becomes sharply deep before image capturing, and the user rapidly rises to the surface after image capturing is high. Therefore, the water depths of the imaging device 1 before and after the user dives and performs shooting are changed like a curved line L1 illustrated in FIG. 10. In FIG. 10, the horizontal axis represents a time t, and the vertical axis represents the water depth d (the downward direction is positive). In contrast, in the case of image capturing when floating illustrated in FIG. 9, the water depth d of the imaging device 1 before and after the user performs shooting is nearly constant, and is changed like the curved line L2 illustrated in FIG. 10.

A curved line L3 illustrated in FIG. 10 illustrates a detection result of the water depth detecting unit 6. The curved line L3 has a similar shape to the curved line L1, and the change is delayed by $\Delta t_1$ from the curved line L1. In other words, the water pressure sensor of the water depth detecting unit 6 has a response time $\Delta t_1$. Therefore, when the user reaches the lowest point under water, the water depth detecting unit 6 outputs a value above the lowest point ($\Delta d_1$ of FIG. 10), and outputs a value of the lowest point when the time passes by $\Delta t_1$ from the point of time of the detection. A recording period $T_r$ of the detection result illustrated in FIG. 10 includes image capturing timing, and a period from the image capturing timing to elapse of a response time $\Delta t_1$ of the water pressure sensor.

In the first embodiment, in light of the fact that the user can hardly press the release switch 5*a* as the operation of the imaging device 1 at the time of the skin diving, in addition to the characteristic of the water depth change of at the time of the skin diving, when the release switch 5*a* is operated in a case where the water depth change per predetermined time exceeds a predetermined threshold, the imaging controller 151 performs control of continuous shooting to obtain a predetermined number of images after changing shooting conditions such as an exposure time and a gain in the imaging unit 2. To be more specific, the imaging controller 151 performs control of improving the sensitivity by shortening the exposure time and increasing the gain, in view of the fact that the body of the user easily swings under water. With such control, the user in a situation of limited movement under water and having difficulty in adjusting image capturing timing can precisely capture a desired subject.

The first embodiment is mainly based on image capturing while diving in a region having a water depth of about 5 m where the user can arrive by skin diving and the degree of freedom as to how to hold the imaging device is low when performing still image capturing or moving image capturing.

If image capturing is performed in a depth deeper than the water depth where the user can reach by the skin diving, like diving using heavy equipment, such as scuba diving, it is necessary to cover the imaging device 1 with an underwater protector or housing that resists the water pressure and protect the imaging device 1. In this case, an accurate water pressure may not be able to be measured with the sensor arranged on the surface of the imaging device 1. Under such a situation, it is more favorable to write information indicating "existing in the underwater protector" as the constraint condition to the image file. This constraint condition may be recorded in conjunction with mode setting in performing the image capturing with the underwater protector. Further, in a case where images or the temporal change in the images are not consistent with a detected water pressure value despite the fact that the images or the temporal change in the images are specific to under water, the control unit 15 may automatically add information indicating such a case to the image file when storing the image file in the storage unit 14. Note that various protection cases other than the underwater protector or housing may cover the sensor portion. In such a case, type information of the protection case may be added to the image file. By adding such information, each sensor data can be more accurately determined.

Figure 11:
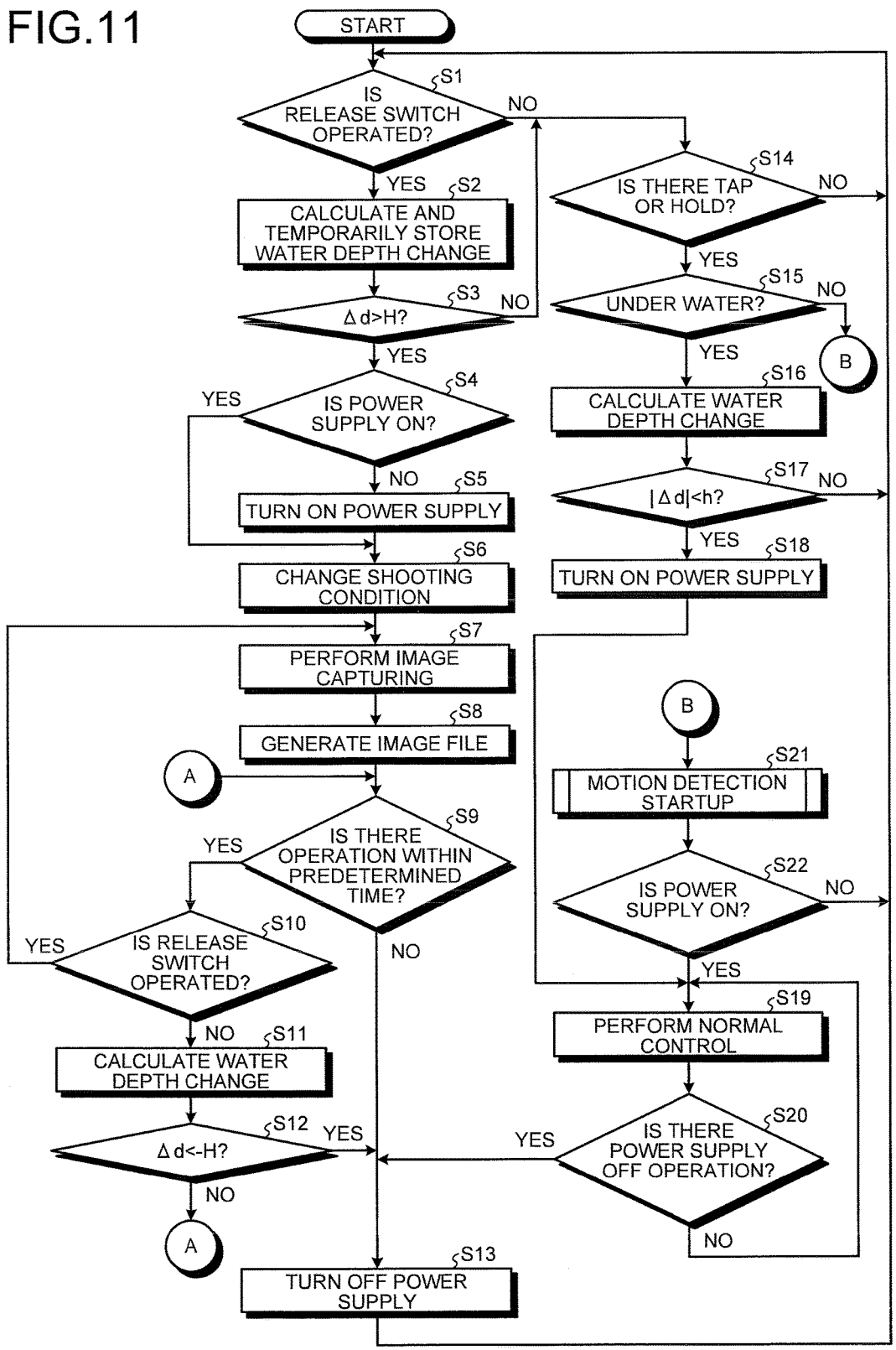
FIG. 11 is a flowchart illustrating an outline of processing performed by the imaging device according to the first embodiment of the present invention.

FIG. 11 is a flowchart illustrating an outline of processing performed by the imaging device 1. First, when the release switch 5a of the operation input unit 5 is operated (Yes in step S1), the water depth change calculating unit 7 calculates change of two recent water depths detected by the water depth detecting unit 6, and temporarily stores the result in the storage unit 14 (step S2). As a result of the calculation of the water depth change calculating unit 7, when a change amount Δd (see FIG. 10) of the water depths is larger than a second threshold H (>0) (Yes in step S3), if the power supply is not ON in the imaging device 1 (No in step S4), the power supply controller 152 controls the power supply unit 16 to transfer to the power suppliable state to the entire imaging device 1 (step S5). Hereinafter, the transfer of the power supply unit 16 to the power suppliable state to the entire imaging device 1 is referred to as "turning ON the power supply". As the second threshold H, a value of about 1 m can be employed. Further, the detection period Δt of the water depth detecting unit 6 can be about 2 seconds.

In step S4, when the power supply is ON in the imaging device 1 (Yes in step S4), the imaging device 1 proceeds to step S6.

In step S6, the imaging controller 151 changes the shooting conditions (step S6), and causes the imaging unit 2 to perform image capturing (step S7). To be specific, the imaging controller 151 sets the exposure time in the imaging unit 2 to be shorter than the initial setting, and increases the gain of the imaging unit 2 from the initial setting, and then controls the imaging unit 2 to perform continuous shooting to obtain a predetermined number of images (for example, five images). In this case, if the imaging controller 151 causes the auxiliary light projecting unit 13 to project the auxiliary light, the imaging controller 151 can make up for a red component, which is more likely to be lost under water, and can capture more bright images. Therefore, it is more favorable.

Following that, the image processing unit 3 adds the use condition data and the constraint conditions of the condition detecting unit (including the sensor characteristic information and reliability information of the sensors) to the generated image data to generate an image file, and writes and stores the generated image file to the image file storage unit 141 (step S8). At this time, this image data may be played back for confirmation. When the image data is played back, the environment information and the condition information are displayed together, and correction and the like based on the constraint condition of the condition detecting unit is performed as needed, and the image data is displayed.

Following that, when there is an operation by the operation input unit 5 within a predetermined time (for example, one minute) (Yes in step S9), and the release switch 5a is operated (Yes in step S10), the imaging device 1 returns to step S7. On the other hand, if the release switch 5a is not operated (No in step S10), the water depth change calculating unit 7 calculates the change amount Δd of the water depths using the two recent detection results of the water depth detecting unit 6 (step S11). When the calculation result is smaller than a predetermined value −H (third threshold) (Yes in step S12), the power supply controller 152 controls the power supply unit 16 to stop the supply of the power to the entire imaging device 1 except the portions to which the power is supplied on a steady basis (step S13). Hereinafter, the processing in step S13 is referred to as "turning OFF the power supply".

When there is no operation by the operation input unit 5 within the predetermined time in step S9 (No in step S9), the imaging device 1 proceeds to step S13.

In step S12, when the change amount Δd of the water depths is the third threshold −H or more (No in step S12), the imaging device 1 returns to step S9.

Next, a case where the release switch 5a is not pressed in step S1 (No in step S1) and a case where the change amount Δd of the water depths is the second threshold H or less in step S3 (No in step S3) will be described. In these cases, when the acceleration detecting unit 8 detects the tap or when the hold detecting unit 10 detects the hold (Yes in step S14), the water depth change calculating unit 7 refers to the result detected by the water depth detecting unit 6, and if the value of the latest detection result can be considered as under water (Yes in step S15), the water depth change calculating unit 7 calculates the change amount Δd of the two recent water depths detected by the water depth detecting unit 6 (step S16). To determine whether the imaging device 1 is in water, a water detection switch that is conducted when water intervenes between two electrodes may be provided on the surface of the imaging device 1.

As a result of the calculation of the water depth change calculating unit 7, when an absolute value |Δd| of the change amount of the water depths is smaller than a first threshold h (0<h<H), where the water depth can be considered nearly constant (Yes in step S17), the power supply controller 152 controls the power supply unit 16 to turn ON the power supply (step S18). On the other hand, when the absolute value |Δd| of the change amount of the water depths is the first threshold h or more (No in step S17), the imaging device 1 returns to step S1. The first threshold h is a value of about 30 to 50 cm, for example.

After step S18, the control unit 15 performs normal control (step S19). The "normal control" referred here means to start control as a shooting mode and switch the capturing or the mode according to inputs of various operation signals from the operation input unit 5.

Following that, when the operation to turn OFF the power supply is performed (Yes in step S20), the imaging device 1 proceeds to step S13. On the other hand, when the operation to turn OFF the power supply is not performed (No in step S20), the imaging device 1 continues the normal control (step S19).

Next, in step S14, reference will be made to a case where the acceleration detecting unit 8 does not detect the tap or a case where the hold detecting unit 10 does not detect the hold (No in step S14). In this case, the imaging device 1 returns to step S1.

Next, in step S15, a case where the value of the latest detection result by the water depth detecting unit 6 is not the value that can be considered as under water (No in step S15) will be described. In this case, the imaging device 1 performs motion detection startup processing of turning ON the power supply when detecting predetermined posture change (step S21). Details of the motion detection startup processing will be described below.

When the imaging device 1 is in the power supply ON state (Yes in step S22) after the motion detection startup processing in step S21, the imaging device 1 proceeds to step S19. On the other hand, when the imaging device 1 is not in the power supply ON state (No in step S22) after the motion detection startup processing in step S21, the imaging device 1 returns to step S1.

Figure 12:
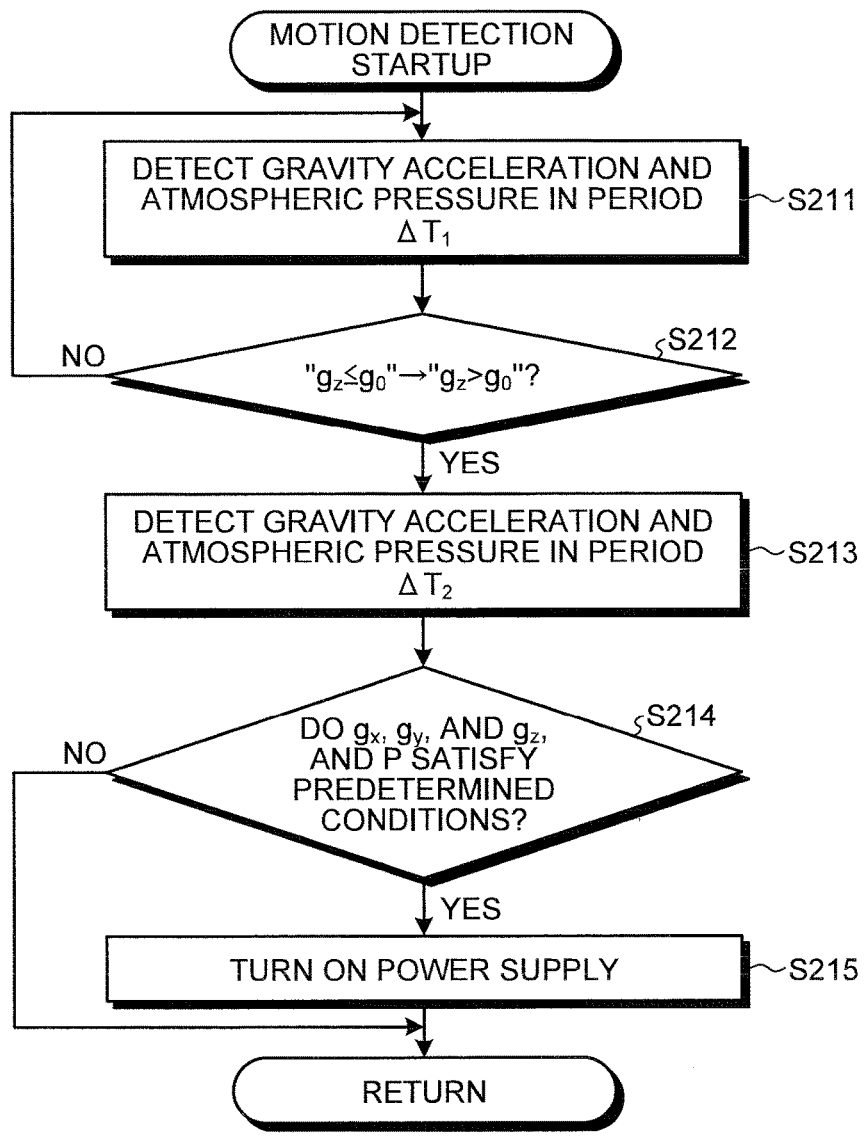
FIG. 12 is a diagram illustrating an outline of motion detection startup processing performed by the imaging device according to the first embodiment of the present invention.

Hereinafter, details of the motion detection startup processing will be described. FIG. 12 is a flowchart illustrating an outline of the motion detection startup processing of step S21. While the acceleration detecting unit 8 detects gravity acceleration ($g_x$, $g_y$, $g_z$) in the imaging coordinate system in a period $\Delta T_1$, the atmospheric pressure detecting unit 11 detects atmospheric pressure P in the period $\Delta T_1$ and stores the detection result in the storage unit 14 (step S211). The period $\Delta T_1$ may be about one second, for example. Note that the detection periods of the acceleration detecting unit 8 and the atmospheric pressure detecting unit 11 may differ.

As a result of the detection of the gravity acceleration in the imaging coordinate system by the acceleration detecting unit 8, when relationship between the gravity acceleration $g_z$ in a z axis direction and a predetermined value $g_0$ is changed from $g_z \leq g_0$ to $g_z > g_0$ (Yes in step S212), the control unit 15 changes the detection period of the gravity acceleration in the acceleration detecting unit 8 to a period $\Delta T_2$ that is shorter than the period $\Delta T_1$, and allows the changed gravity acceleration to be detected (step S213). The period $\Delta T_2$ can be about 1/50 seconds, for example. The predetermined value $g_0$ corresponds to a value of gravity when an angle between one axis of the imaging coordinate system and a vertical direction is smaller than a predetermined angle (for example, about 45 to 60 degrees), and is a value that can be considered that the magnitude of the gravity acceleration in the axis direction cannot be ignored. Note that the detection period of the atmospheric pressure detecting unit 11 may be similarly the period $\Delta T_2$, or the period $\Delta T_1$ may remain. As described above, when the condition detecting unit periodically detects the condition, the image file may be generated by associating the time data in the detection with the information related to the constraint conditions of the condition detecting unit and the use condition data.

In contrast, as a result of the detection of the gravity acceleration in the imaging coordinate system by the acceleration detecting unit 8, when the relationship between the gravity acceleration $g_z$ in the z axis direction and the predetermined value $g_0$ is unchanged from $g_z \leq g_0$ (No in step S212), the imaging device 1 returns to step S211.

In step S213, after changing the detection period of the acceleration detecting unit 8 from the period $\Delta T_1$ to the period the posture determining unit 9 determines whether the gravity acceleration ($g_x$, $g_y$, $g_z$) and the atmospheric pressure P satisfy predetermined conditions (step S214). When the gravity acceleration ($g_x$, $g_y$, $g_z$) and the atmospheric pressure P satisfy the predetermined conditions (Yes in step S214), the power supply controller 152 performs control to turn ON the power supply (step S215). Following that, the imaging device 1 returns to the main routine, and proceeds to step S22. The predetermined conditions determined in step S214 are conditions related to temporal change of the gravity acceleration ($g_x$, $g_y$, $g_z$) and the atmospheric pressure P. For example, after the components of the gravity acceleration and the atmospheric pressure are detected a predetermined number of times, the detected values falling within predetermined ranges can be employed as the conditions. Further, when vibration patterns can be seen in the temporal change of the components of the gravity acceleration and the atmospheric pressure, periods of the vibrations may be employed as the conditions.

In contrast, as a result of the determination of the posture determining unit 9 in step S214, when the gravity acceleration ($g_x$, $g_y$, $g_z$) and the atmospheric pressure P do not satisfy the predetermined conditions (No in step S214), the imaging device 1 returns to the main routine, and proceeds to step S22.

Figure 13:
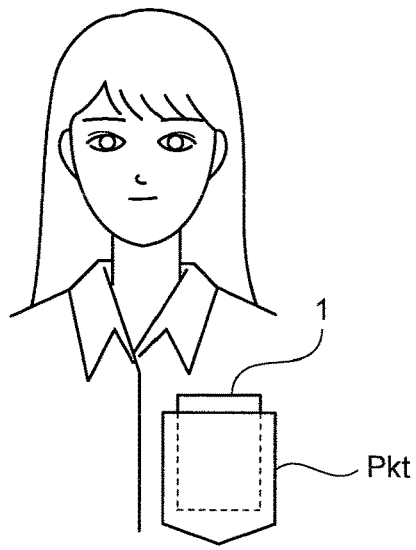
FIG. 13 is a diagram illustrating a situation in which a user has the imaging device according to the first embodiment of the present invention in a chest pocket of a shirt.
Figure 14:
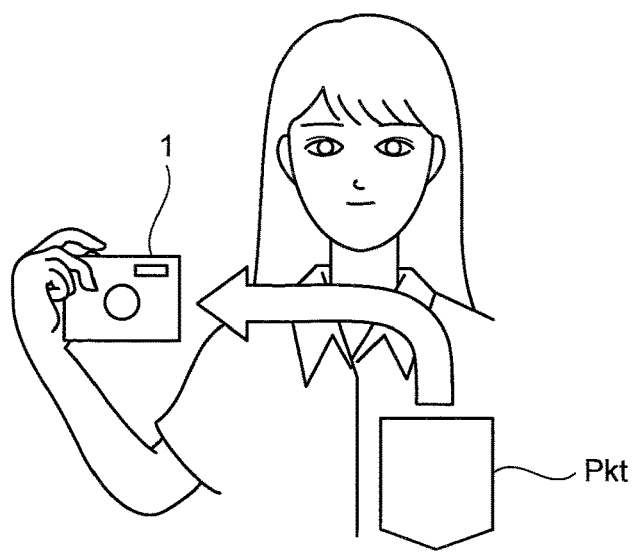
FIG. 14 is a diagram illustrating a situation in which a user takes out the imaging device according to the first embodiment of the present invention from the chest pocket of the shirt and holds the imaging device in a posture of performing image capturing.

FIGS. 13 and 14 are diagrams illustrating situations where the imaging device 1 is started by the above-described motion detection startup processing. To be specific, while FIG. 13 illustrates a situation where the user walks having the imaging device 1 in the chest pocket Pkt of a shirt, FIG. 14 illustrates a situation where the user takes out the imaging device 1 from the chest pocket Pkt of a shirt, and performs shooting.

When the user walks having the imaging device 1 in the chest pocket Pkt of a shirt, the width direction (the y axis direction of FIG. 3) becomes approximately parallel to the vertical direction. Therefore, only the y component $g_y$ of the gravity acceleration in the imaging coordinate system illustrated in FIG. 3 has a value larger than the predetermined value $g_0$. In contrast, when the user holds the imaging device 1, the height direction (z axis direction of FIG. 3) becomes approximately parallel to the vertical direction. Therefore, only the z component $g_z$ of the gravity acceleration in the imaging coordinate system has a value larger than the predetermined value $g_0$.

Figure 15:
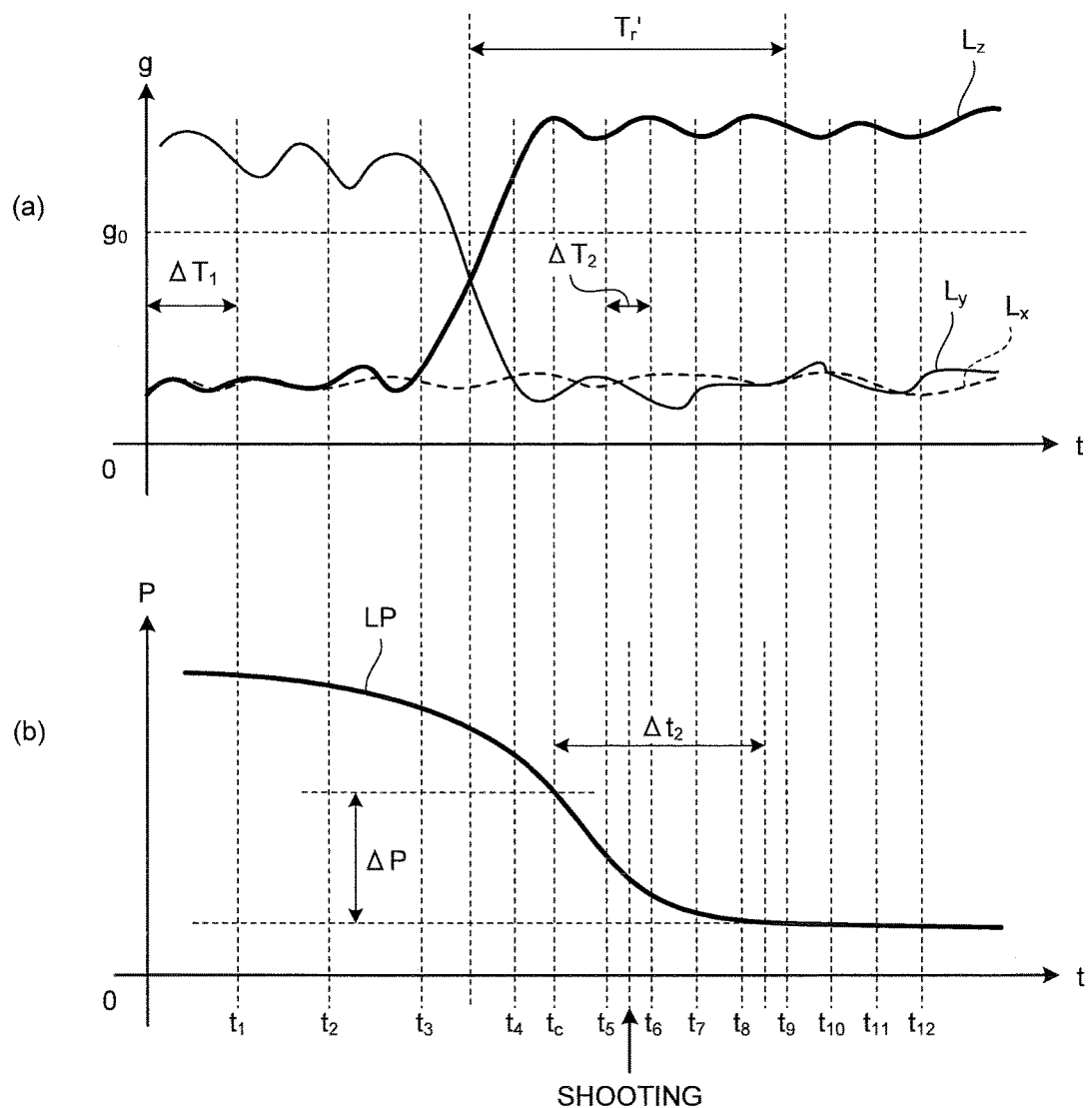
FIG. 15 is a diagram illustrating temporal change in gravity acceleration and atmospheric pressure, for each component, in a coordinate system unique to the imaging device when the situation illustrated in FIG. 13 is changed to a situation illustrated in FIG. 14.

FIG. 15 is a diagram illustrating the temporal change in the gravity acceleration ($g_x$, $g_y$, $g_z$) and the atmospheric pressure P when the situation illustrated in FIG. 13 is changed to a situation illustrated in FIG. 14. In FIG. 15, the horizontal axis t represents the time. In (a) of FIG. 15, the vertical axis g represents the magnitude of the gravity acceleration. Further, in (b) of FIG. 15, the vertical axis P represents the magnitude of the atmospheric pressure. A curved line $L_x$ (indicated by the broken line), a curved line $L_y$ (indicated by the solid line), and a curved line $L_z$ (indicated by the bold line) illustrated in (a) of FIG. 15 respectively indicate the temporal change of the x component $g_x$, the y component $g_y$, and the z component $g_z$ of the gravity acceleration applied to the imaging device 1. Further, a curved line LP illustrated in (b) of FIG. 15 indicates the temporal change of the atmospheric pressure. When the imaging device 1 is held in the chest pocket of the user, only the gravity acceleration $g_y$ in the y axis direction is larger than the predetermined value $g_0$, and other components have values smaller than the predetermined value $g_0$ in the imaging coordinate system. In contrast, when the user holds the imaging device 1 in a posture of capturing, only the gravity acceleration $g_z$ in the z axis direction becomes larger than the predetermined value $g_0$, and other components become smaller than the predetermined value $g_0$. FIG. 15 illustrates a case where the imaging device 1 is taken out between a time $t_3$ and a time $t_4$.

In (b) of FIG. 15, a time when the atmospheric pressure becomes an approximately constant value is a time after $\Delta t_2$ from the time $t_c$ where the z component $g_z$ of the gravity acceleration becomes approximately constant. Therefore, the response time of the atmospheric pressure sensor of the atmospheric pressure detecting unit 11 is $\Delta t_2$. In the case of (b) of FIG. 15, the atmospheric pressure detecting unit 11 outputs a value higher than a lowest value by $\Delta P$ as a detection value at the time $t_c$. Further, a recording period $T_r'$ of the detection result includes the image capturing timing, and a period from the image capturing timing to elapse of the response time $\Delta t_2$ of the atmospheric pressure sensor.

As described above, in the first embodiment, when the user can be determined to hold the imaging device 1 in the posture of capturing, the period of the gravity detection is made short ($\Delta T_1 \rightarrow \Delta T_2$) and more detailed gravity change is detected, and when the gravity change and the atmospheric pressure change satisfy the respective predetermined conditions, the power supply controller 152 controls the power supply unit 16 to turn ON the power supply. At that time, the condition of the atmospheric pressure change is determined by reference to a response delay due to the sensor characteristic of the atmospheric pressure detecting unit 11, as well as using the detection result of the atmospheric pressure detecting unit 11.

According to the above-described first embodiment of the present invention, even if sensors for determining a usage environment, a situation, and the like have errors, error-adjusted information can be added.

Further, according to the first embodiment, the image file is generated, by associating the image data generated by the imaging unit, the detection result of the conditions by the condition detecting unit in the predetermined period, and the information related to the characteristic of the condition detecting unit. Therefore, even when the capturing environment is changed with time, the image capturing and the image capturing environment can be associated with high reliability. As a result, posture information of the user at the time of performing image capturing can be determined. Such information may have an error. Therefore, it is more favorable to record the fact that the information may have an error, as the reliability information.

Further, according to the first embodiment, the information related to the characteristic of the condition detecting unit includes the response delay of the detection in the condition detecting unit. Therefore, the information may be associated with the image data, reflecting the constraint condition such as the response characteristic of the condition detecting unit. That is, according to the first embodiment, the information acquiring unit that acquires the information data of the object, the condition detecting unit that detects the use condition data of the information acquiring device, and the control unit that generates the file in which the information data, the use condition data, and the information related to the constraint conditions of the condition detecting unit are associated are included. Therefore, appreciation and determination can be made in view of a usage environment and condition in acquiring information of images and audio. The information related to the constraint conditions of the condition detecting unit includes information related to either arrangement or performance of the condition detecting unit. Therefore, wrong playback is not performed, in light of the response characteristic, the time constants, and the resolution.

Further, according to the first embodiment, the period including the point of time when the imaging is performed to generate the image data is set as the predetermined period. Therefore, the condition at the time of imaging can be reliably associated with the image data.

Further, according to the first embodiment, the case of being under water and the case of being on the ground are detected as different states, and the recording form of the image data according to the operation of the operation input unit is switched according to the detection result. Therefore, capturing according to a characteristic of a capturing place can be performed.

Further, according to the first embodiment, in a case where the tap operation or the hold operation is detected under water, when the water depth is almost unchanged, the supply of the power to the entire device is started. Therefore, the power supply can be easily supplied under an appropriate condition in performing image capturing under water.

Further, according to the first embodiment, in a case where the water depth is nearly constant, and the tap operation or the hold operation is detected, it is recognized that the user has indicated his/her intention to start of the operation of the imaging device 1, and the processing of turning ON the power supply is performed. Therefore, a more prompt operation than pressing a small switch can be performed.

Further, according to the first embodiment, the continuous shooting is performed to obtain a predetermined number of images when the release switch is pressed in the case of diving in the deep suddenly. With this feature, even if it is difficult for a user to swim, there is a high possibility of including a desired image in the images obtained by the continuous shooting. Therefore, the image capturing can be easily performed during diving, and the desired image can be acquired with high possibility.

Further, according to the first embodiment, the power supply is frequently turned OFF when the user rises to the surface or when no release signal is input. Therefore, the battery can last for a long time.

Note that, when the user uses the imaging device 1 on the ground, the normal control to switch the still image capturing and the moving image capturing may be performed with a switch operation.

Second Embodiment

An imaging device according to a second embodiment of the present invention is one form of an information acquiring device that includes an information acquiring unit that acquires information data of an object, a condition detecting unit that detects use condition data of the information acquiring device, and a control unit that generates a file in which the information data, the use condition data, and information related to a constraint condition of the condition detecting unit are associated. The imaging device switches between shooting modes according to how to hold the imaging device in a case where a user floats near the surface of the water. The configuration of the imaging device according to the second embodiment is similar to the configuration of the imaging device described in the first embodiment.

FIG. 16 is a diagram illustrating how to hold an imaging device 1 in still image capturing and moving image capturing and difficulty in a switch operation according to use situations of the imaging device 1. In a case where user performs shooting while skin diving (see FIG. 8), a possibility that the user uses one hand for swim is high. Under such a situation, in a case where the user wishes to hold the imaging device 1 with one hand, it is favorable to control the imaging device 1 to perform the still image capturing. In the second embodiment, similarly to the first embodiment, in a case of performing the skin diving capturing, an imaging controller 151 performs control to change shooting conditions such as exposure and a gain, and perform continuous shooting.

In contrast, in a case where the user floats and swims near the surface of the water (see FIG. 9), the user is in a relatively stable posture. Therefore, a switch operation is easy, and holding the imaging device 1 with both hands is possible. Further, in a case of performing the moving image capturing, the user can perform the capturing while moving the imaging device 1 with one hand. Therefore, while the imaging controller 151 performs the still image capturing in a case where the user holds the imaging device 1 with both hands, the imaging controller 151 performs control to perform the moving image capturing in a case where the user holds the imaging device 1 with one hand.

In a case where a photographer uses the imaging device 1 on the ground, a control unit 15 performs normal control. That is, in a case where the imaging device 1 is on land, the control unit 15 switches the still image capturing and the moving image capturing with a switch operation.

Figure 17:
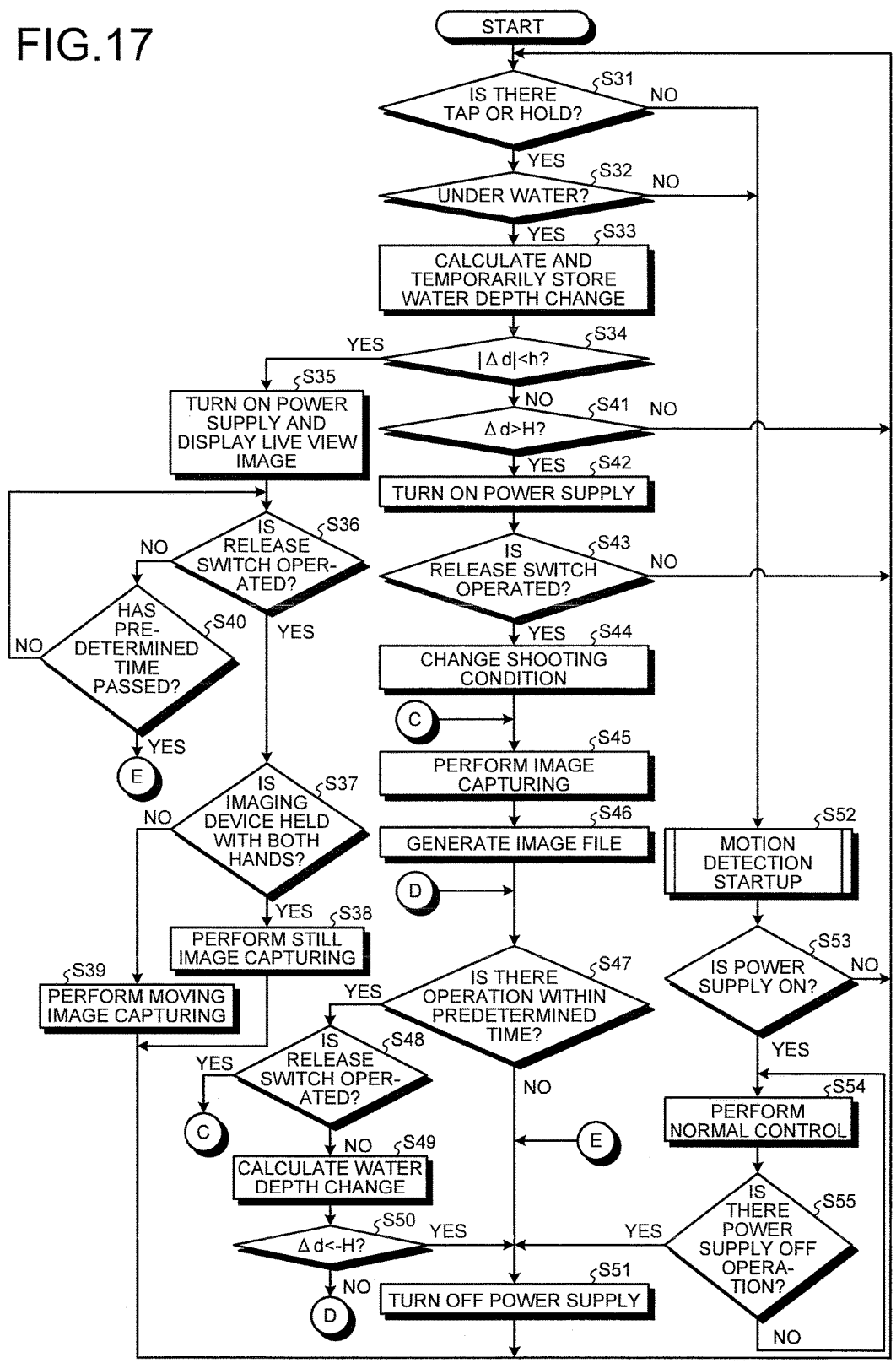
FIG. 17 is a flowchart illustrating an outline of processing performed by the imaging device according to the second embodiment of the present invention.

FIG. 17 is a flowchart illustrating an outline of processing performed by the imaging device 1. In FIG. 17, first, a case where an acceleration detecting unit 8 detects tap or a hold detecting unit 10 detects hold (Yes in step S31) will be described. In this case, a water depth change calculating unit 7 refers to a result detected by a water depth detecting unit 6, and when a value of a latest detection result is a value that can be considered as under water (Yes in step S32), the water depth change calculating unit 7 calculates a change amount Δd of two recent water depths detected by the water depth detecting unit 6, and temporarily stores the result in a storage unit 14 (step S33).

As a result of the calculation of the water depth change calculating unit 7, when an absolute value |Δd| of the change amount of the water depths is smaller than a first threshold h, and the water depth can be considered constant (Yes in step S34), a power supply controller 152 controls a power supply unit 16 to turn ON power supply, and a display unit 4 displays a live view image of images imaged by an imaging unit 2 (step S35). Following that, when a release switch 5a of an operation input unit 5 is operated (Yes in step S36), processing differs depending on the detection result of the hold detecting unit 10. To be specific, as a result of the detection of the hold detecting unit 10, when the imaging device 1 is held with both hands (Yes in step S37), the imaging device 1 performs the still image capturing (step S38), and returns to step S31. In contrast, when the imaging device 1 is held with one hand (No in step S37), the imaging device 1 performs the moving image capturing (step S39), and returns to step S31.

In step S36, when the release switch 5a is not operated (No in step S36), if a predetermined time has not yet passed since the power supply is turned ON in step S35 (No in step S40), the imaging device 1 returns to step S36. On the other hand, if the predetermined time has passed since the power supply is turned ON in step S35 (Yes in step S40), the imaging device 1 proceeds to step S51 described below.

Next, in step S34, a case in which the absolute value |Δd| of the change amount of the water depths is the first threshold h or more (No in step S34) will be described. In this case, when the change amount Δd of the water depth is larger than a second threshold H (Yes in step S41), the power supply controller 152 performs control to turn ON the power supply (step S42). Following that, when the release switch 5a is operated (Yes in step S43), the imaging controller 151 changes the shooting conditions (step S44), and causes the imaging unit 2 to perform image capturing (step S45). To be specific, similarly to the first embodiment, the imaging controller 151 performs control to make an exposure time of the imaging unit 2 shorter than initial setting, and to increase a gain of the imaging unit 2 from the initial setting, and then controls the imaging unit 2 to perform continuous shooting to obtain a predetermined number of images. A point that it is more favorable to cause an auxiliary light projecting unit 13 to project auxiliary light when the imaging unit 2 performs image capturing is also similar to the first embodiment.

Next, an image processing unit 3 adds use condition data and constraint conditions of a condition detecting unit to generated image data to generate an image file, and writes and stores the generated image file in an image file storage unit 141 (step S46). Even in the second embodiment, the generated image data may be played back for confirmation, or environment information and condition information are displayed together when the image data is played back, and correction and the like based on the constraint conditions of the condition detecting unit may be performed as needed.

When the change amount Δd of the water depths is the second threshold H or less in step S41 (No in step S41), and when the release switch 5a is not operated in step S43 (No in step S43), the imaging device 1 returns to step S31.

Steps S47 to S51 performed following step S46 are sequentially correspond to steps S9 to S13 in FIG. 11.

Next, a case in which the acceleration detecting unit 8 does not detect the tap in step S31 and the hold detecting unit 10 does not detect the hold (No in step S31), and a case where the latest detection result by the water depth detecting unit 6 is not the value that can be considered as under water in step S32 (No in step S32) will be described. In these cases, the imaging device 1 proceeds to motion detection startup processing (step S52). Details of the motion detection startup processing is the same as the above-described first embodiment (see FIG. 12).

When the imaging device 1 is in a power supply ON state after the motion detection startup processing (Yes in step S53), the imaging device 1 performs normal control (step S54). On the other hand, when the imaging device 1 is not in the power supply ON state (No in step S53), the imaging device 1 returns to step S31.

Following step S54, when an operation to turn OFF the power supply is applied through the operation input unit 5 (Yes in step S55), the imaging device 1 proceeds to step S51. On the other hand, when the operation to turn OFF the power supply is not applied (No in step S55), the imaging device 1 continues the normal control (step S54).

According to the above-described second embodiment of the present invention, even if sensors for determining a usage environment, a situation, and the like have errors, error-adjusted information can be added, similarly to the first embodiment.

Further, according to the second embodiment, similarly to the first embodiment, even if the capturing environment is changed with time, image capturing and image capturing environment can be associated with high reliability.

Further, according to the second embodiment, the similarly to the first embodiment, the image data can be associated reflecting a response characteristic of the condition detecting unit, and condition in the imaging and the image data can be reliably associated.

Further, according to the second embodiment, the still image capturing and the moving image capturing are switched according to how to hold the imaging device by the user at the time of diving. Therefore, optimum control can be performed according to a dive situation of the user. Especially, if temporal change of water pressure excessively applied when the user jumps in the water or when the user rapidly rises to the surface of the water is considered, such consideration can serve as effective information in estimating correct water pressure. That is, according to the second embodiment, the information acquiring unit that acquires information data of an object, the condition detecting unit that detects use condition data of the information acquiring device, and the control unit that generates a file in which the information data, the use condition data, and information related to a constraint condition of the condition detecting unit are associated are included. Therefore, appreciation and determination can be made in view of a usage environment and condition in acquiring information of an image. If a temporal change characteristic and actual temporal change data are recorded, conversion to data from which an error has been cancelled or reduced can be easily performed. Information related to the constraint conditions of the condition detecting unit includes information related to either arrangement or performance of the condition detecting unit. Therefore, wrong playback is not performed, in light of a response characteristic, time constants, and a resolution. Further, in a case where images are classified by water pressure, there is a possibility that the above error is led to a wrong classification result. Therefore, by providing correct information, value of acquired content can be enhanced.

Other Embodiments

Modes for carrying out the present invention have been described. However, the present invention is not limited only by the first and second embodiments. For example, an information acquiring device can be realized as a device such as an IC recorder that acquires audio data with a sound collecting unit such as a microphone and generates an audio file. In this case, for example, a configuration to collect sounds only when the user holds up the device can be employed. Further, in this case, posture information of the user of at the time of collecting sounds can be determined using various information such as a specification of the device. However, an error may be caused in such information. Therefore, it is more favorable to record the fact that the error may be caused, as reliability information. Further, a file in which only environment change information is recorded as log data may be further generated. When acquiring the audio information, if playback is performed based on a posture and a usage environment when the device faces an object, a large amount of information can be playbacked, similarly to the imaging device. Note that the image data and the audio data may be acquired together, and an image file including the data may be generated. In a case of realizing an information playback device that plays back audio, special processing is performed on the audio to recognize a situation at the time of recording the sound only by listening the sound.

Further, the condition detecting unit may detect at least one of speed, temperature, humidity, and longitude and latitude as positional information detected by global positioning system (GPS). In a case where the imaging device has a configuration including a temperature sensor or a humidity sensor, and to detect the temperature and/or the humidity as a surrounding environment, it is more favorable to store a relationship between measurement accuracy of other various sensors, and the temperature and/or the humidity, as characteristic information of the various sensors, to a sensor characteristic storage unit 143, in addition to a response time of the temperature sensor and/or the humidity sensor. An error may be instantly caused in the humidity sensor, when the sensor is arranged in a place held by the user, or the sensor is arranged in a place where water drops are more likely to remain. Therefore, by recording the reliability information that describes the fact that the error is easily caused according to the arrangement or performance, in the image file, as a part of constraint conditions, so that wrong determination can be prevented. Further, in a case where the imaging device is equipped with a speed sensor and a GPS sensor, information (detection error) related to position detection accuracy of the GPS sensor can be stored in the sensor characteristic storage unit 143 in association with the speed information, in addition to a response time of the speed sensor.

Azimuth information, posture information, elevation angle and depression angle information, and the like at the time of performing image capturing may be equally treated to the various information, in addition to the above sensors. Further, pulse information and body temperature information obtained by detecting hold of the user, expression and biological information using an in-camera, and the like are also applicable.

Further, a part of switch operations may be performed by shaking the imaging device by the user, instead of tapping a surface of the imaging device or holding the imaging device by the user.

In the flowcharts in the specification, the context of the processing among the steps is explicitly described using the expressions such as "first", "following that", and "next". However, the order of the processing necessary for implementing the above embodiments is not uniquely determined by these expressions. That is, the order of the processing in the flowcharts in the specification can be changed in a range without contradiction.

Further, the algorithms of the processing explained using the flowcharts in the specification can be explained as a program. Such a program may be recorded in a storage unit inside a computer, or may be recorded in a computer-readable recording medium. Recording of the program in the storage unit or the recording medium may be performed when the computer or the recording medium is shipped as a product, or may be performed by download through a communication network.

The present invention is applicable to devices that acquire information other than images and audio, devices that play back the acquired information, and devices (measurement devices, observation devices, and diagnosis devices) that process the acquired information and provide different information, instead of displaying the acquired information as it is.

[Supplementary Note 1]

An imaging device including:

an imaging unit configured to image a subject to generate image data of the subject;

a condition detecting unit configured to periodically detect a condition of the imaging device;

a storage unit configured to store the image data generated by the imaging unit, a detection result of the condition by the condition detecting unit in a recording period, and information on characteristics of the condition detecting unit; and a file generating unit configured to generate an image file such that the image data, the detection result in the recording period, and the information on characteristics of the condition detecting unit are associated with one another.

[Supplementary Note 2]

The imaging device according to supplementary note 1, wherein the information on characteristics of the condition detecting unit includes information on a response time when the condition detecting unit detects the condition.

[Supplementary Note 3]

The imaging device according to supplementary note 2, further including an operation input unit configured to receive an input of an operation signal including an image capturing instruction signal for instructing image capturing by the imaging unit, wherein the recording period includes a point in time of receiving the input of the image capturing instruction signal, and a period from the point in time to elapse of the response time.

[Supplementary Note 4]

The imaging device according to any one of supplementary notes 1 to 3, wherein the condition detecting unit is configured to identify whether the imaging device is in water or on land, and the condition detecting unit includes:

a water depth detecting unit configured to detect a water depth of the imaging device when the imaging device is in water; and an atmospheric pressure detecting unit configured to detect atmospheric pressure applied to the imaging device when the imaging device is on land.

[Supplementary Note 5]

The imaging device according to any one of supplementary notes 1 to 4, wherein the condition detecting unit is configured to detect a surrounding environment of the imaging device, and the information on characteristics of the condition detecting unit includes a relationship between detection accuracy of the condition detected by the condition detecting unit and the surrounding environment.

[Supplementary Note 6]

The imaging device according to supplementary note 5, wherein the condition detecting unit is configured to detect at least one of temperature and humidity as the surrounding environment of the imaging device, and the information on characteristics of the condition detecting unit includes a relationship between detection accuracy of the condition detected by the condition detecting unit other than the temperature and the humidity, and at least one of the temperature and the humidity.

[Supplementary Note 7]

The imaging device according to any one of supplementary notes 1 to 6, wherein the condition detecting unit is configured to detect a position and speed of the imaging device, and the information on characteristics of the condition detecting unit includes a relationship between detection accuracy of the position detected by the condition detecting unit and the speed.

[Supplementary Note 8]

An imaging method executed by an imaging device for imaging a subject to generate image data of the subject, the method including:

a condition detecting step of periodically detecting a condition of the imaging device by a condition detecting unit;

an imaging step of generating the image data when an input of an image capturing instruction signal for instructing image capturing is received during the condition detecting step; and a file generating step of generating an image file such that the image data generated in the imaging step, a detection result of the condition recorded in the condition detecting step in a recording period, and information on characteristics of the condition detecting unit are associated with one another.

[Supplementary Note 9]

An imaging program for causing an imaging device that images a subject to generate image data of the subject, to execute:

a condition detecting step of periodically detecting a condition of the imaging device by a condition detecting unit;

an imaging step of generating the image data when an input of an image capturing instruction signal for instructing image capturing is received during the condition detecting step; and a file generating step of generating an image file such that the image data generated in the imaging step, a detection result of the condition recorded in the condition detecting step in a recording period, and information on characteristics of the condition detecting unit are associated with one another.

According to some embodiments, even if sensors for determining a usage environment, conditions, and the like have errors, it is possible to add error-adjusted information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information acquiring device for acquiring information data of an object, the information acquiring device comprising:

a condition detecting sensor configured to detect use condition data of the information acquiring device; and a file generating unit configured to generate a file in which the information data, the use condition data detected by the condition detecting sensor, and information on at least one response characteristic of the condition detecting sensor are associated with one another.

2. The information acquiring device according to claim 1, wherein the information on the at least one response characteristic includes information on arrangement or performance of the condition detecting sensor.

3. An information acquiring device for acquiring information data of an object, the information acquiring device comprising:
   a condition detecting sensor configured to periodically detect use condition data of the information acquiring device; and
   a file generating unit configured to generate a file in which time data when the use condition data is detected, the use condition data, and information on at least one response characteristic of the condition detecting sensor are associated with one another.

4. The information acquiring device according to claim 3, wherein
   the information on the at least one response characteristic includes information on arrangement or performance of the condition detecting unit.

5. An information playback device for playing back information acquired by an information acquiring device, the information acquiring device being configured to acquire information data of an object and including a condition detecting sensor configured to detect use condition data of the information acquiring device, the information playback device comprising:
   a playback control unit configured to:
      acquire a file in which the information data of the object acquired by the information acquiring device, the use condition data of the information acquiring device, and information on at least one response characteristic of the condition detecting sensor are associated with one another; and
      play back information which has been processed according to the at least one response characteristic, together with the information data.

6. A method for acquiring information executed by an information acquiring device for acquiring information data of an object, the method comprising:
   acquiring the information data of the object and storing the information data in a storage unit;
   detecting use condition data of the information acquiring device and storing the use condition data in the storage unit; and
   reading the information data and the use condition data from the storage unit, and generating a file in which the information data and the use condition data are associated with information on at least one response characteristic in detecting the use condition data.

7. A method for acquiring information executed by an information acquiring device for acquiring information data of an object, the method comprising:
   acquiring the information data of the object and storing the information data in a storage unit;
   periodically detecting use condition data of the information acquiring device and storing the use condition data in the storage unit; and
   reading, from the storage unit, the use condition data and time data when the use condition data is detected, and generating a file in which the time data and the use condition data are associated with information on at least one response characteristic in detecting the use condition data.

8. A method for playing back information executed by an information playback device for playing back information acquired by an information acquiring device, the information acquiring device being configured to acquire information data of an object and including a condition detecting sensor configured to detect use condition data of the information acquiring device, the method comprising:
   acquiring, from a storage unit, a file in which the information data of the object acquired by the information acquiring device, the use condition data of the information acquiring device, and information on at least one response characteristic of the condition detecting sensor are associated with one another; and
   playing back information which has been processed according to the at least one response characteristic, together with the information data.

9. A non-transitory computer-readable recording medium with an executable program stored thereon, the program instructing an information acquiring device that acquires information data of an object, to execute:
   acquiring the information data of the object;
   detecting use condition data of the information acquiring device; and
   generating a file in which the information data, the use condition data, and information on at least one response characteristic in detecting the use condition data are associated with one another.

10. A non-transitory computer-readable recording medium with an executable program stored thereon, the program instructing an information acquiring device that acquires information of an object, to execute:
   acquiring the information data of the object and storing the information data in a storage unit;
   periodically detecting use condition data of the information acquiring device; and
   generating a file in which time data when the use condition data is detected, the use condition data, and information on at least one response characteristic in detecting the use condition data are associated with one another.

11. A non-transitory computer-readable recording medium with an executable program stored thereon, the program instructing an information playback device that plays back information acquired by an information acquiring device, the information acquiring device being configured to acquire information data of an object and including a condition detecting sensor configured to detect use condition data of the information acquiring device, to execute:
   acquiring, from a storage unit, a file in which the information data of the object acquired by the information acquiring device, the use condition data of the information acquiring device, and information on at least one response characteristic of the condition detecting unit are associated with one another, and playing back information which has been processed according to the at least one response characteristic, together with the information data.

12. The information playback device of claim 5 wherein processing the play back information according to the at least one response characteristic includes determining an error due to the time delay of the condition detecting sensor.

13. The information playback device of claim 5 wherein processing the play back information according to the at least one response characteristic includes correcting an error due to the time delay of the condition detecting sensor.

14. The information playback device of claim 5 wherein the condition detecting sensor is a water depth detecting unit.

15. The method of claim 8 wherein processing the play back information according to the at least one response characteristic includes determining an error due to the time delay of the condition detecting sensor.

16. The method of claim 8 wherein processing the play back information according to the at least one response characteristic includes correcting an error due to the time delay of the condition detecting sensor.

17. The method of claim 8 wherein the condition detecting sensor is a water depth detecting unit.

18. The information acquiring device of claim 1 wherein the at least one response characteristic includes a time delay of the condition detecting sensor.

19. The method of claim 6 wherein the at least one response characteristic includes a time delay in detecting the use condition data.

20. The non-transitory computer-readable recording medium of claim 9 wherein the at least one response characteristic includes a time delay in detecting the use condition data.

* * * * *